United States Patent [19]

Spector

[11] Patent Number: 4,567,091
[45] Date of Patent: Jan. 28, 1986

[54] ADHESIVE SPORTS TAPE

[76] Inventor: Donald Spector, 380 Mountain Rd., Union City, N.J. 07087

[21] Appl. No.: 749,387

[22] Filed: Jun. 27, 1985

[51] Int. Cl.⁴ .................. D03D 13/00; B32B 1/00; B32B 5/14
[52] U.S. Cl. .................. 428/222; 273/75; 273/81 D; 273/81.5; 428/36; 428/40; 428/305.5; 428/317.1; 428/318.8
[58] Field of Search .......... 273/75, 81 D, 81.5; 428/36, 40, 222, 305.5, 317.1, 317.3, 317.7, 318.6, 318.8, 906

[56] References Cited

U.S. PATENT DOCUMENTS

| | | | |
|---|---|---|---|
| 3,262,827 | 7/1966 | Kallander et al. | 428/317.3 |
| 3,654,061 | 4/1972 | Berwanger | 428/318.8 |
| 4,053,676 | 10/1977 | Kaminstein | 428/305.5 |
| 4,347,280 | 8/1982 | Lau et al. | 273/75 |
| 4,361,326 | 11/1982 | Kokes | 273/81 D |

FOREIGN PATENT DOCUMENTS 747341  11/1966  Canada .................. 428/40

Primary Examiner—William J. Van Balen
Attorney, Agent, or Firm—Michael Ebert

[57] ABSTRACT

An adhesive sports tape windable about the handle of a sports appliance such as a tennis racquet to create a sheath thereabout which acts not only to enhance the grip of the handle but also as pneumatic cushioning minimizing the transmission of shock forces from the handle to the hand of the player. The tape is formed by a flexible band having an open-cell foam plastic core and opposing, gas-impermeable facing skins. The inner skin is coated with a pressure-sensitive adhesive layer to adhere the tape to the handle. The outer skin of the tape when the sheath is formed, is engaged by the hand of the player. The gas filling the cells of the core is entrapped within the tape by the skins, whereby when the tape-formed sheath is manually compressed by the player, it seeks to rebound to its original shape, thereby providing a pneumatic cushioning action. The surface of the skins is irregular, thereby enhancing the grip characteristics of the sheath.

7 Claims, 5 Drawing Figures

U.S. Patent  Jan. 28, 1986  4,567,091
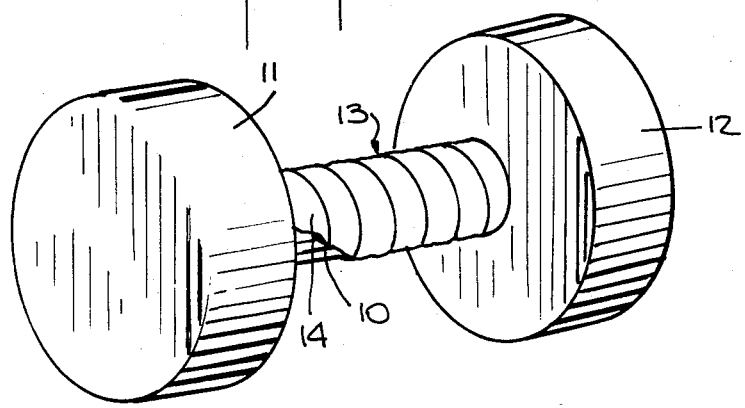
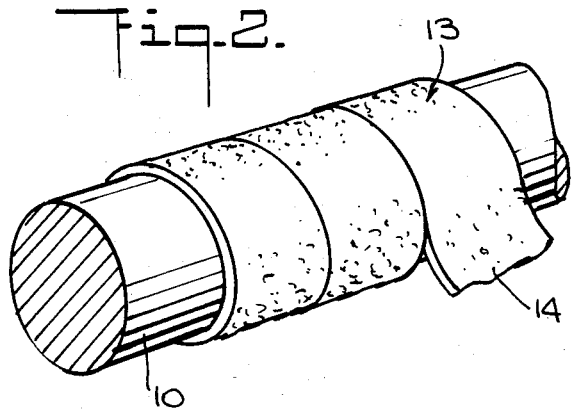
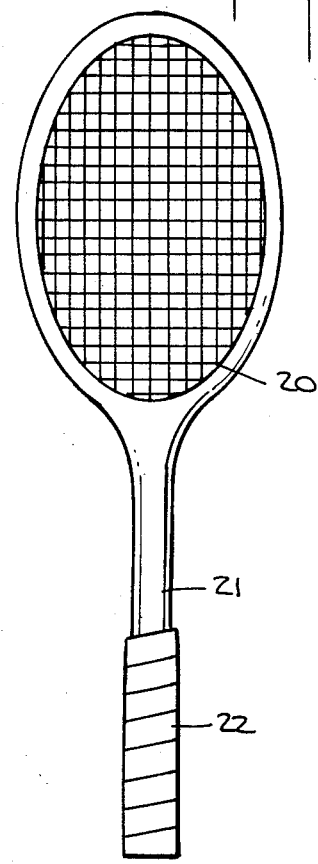
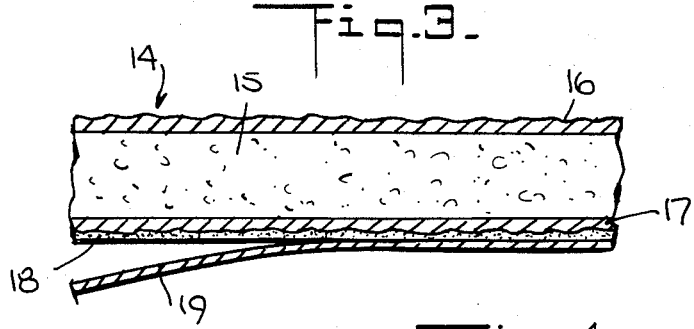
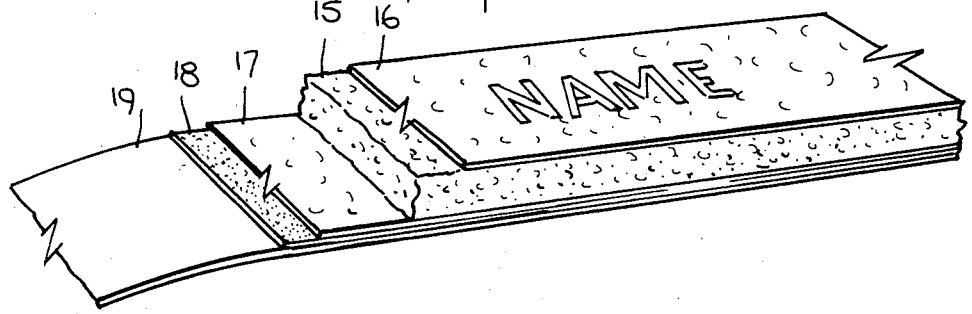

ADHESIVE SPORTS TAPE

BACKGROUND OF INVENTION

1. Field of Invention

This invention relates generally to adhesive tapes which when wound about the handle of a sports appliance creates a sheath thereabout, and more particularly to a sport tape which imparts pneumatic cushioning characteristics to the sheath formed thereby, and which enhances the grip of the handle.

2. State of the Art

In many types of sports equipment, such as tennis racquets, baseball bats and exercise bar bells, the handle thereof is usually of a hard, smooth material. As a consequence, the handle becomes slippery, especially when in the course of play, moisture from the hand coats the handle surface. Also, in some cases, the cross-sectional dimension of the handle may render it uncomfortable to a player with a large hand, for the handle does not have an adequate gripping surface.

It is therefore common practice for a player to wipe the handle of his sports appliance with one or more layers of friction tape to create a sheath thereabout. This effectively enlarges the cross-sectional dimension of the handle to an extent which satisfies the player's requirements. And because friction tape is made of woven cloth having a coarse finish, the resultant rough sheath surface affords an enhanced grip.

Because friction tape makes use of a porous cloth which is permeated by adhesive, it has a characteristic stickiness which gives it an unpleasant "feel". Also a handle sheath formed from friction tape lacks cushioning properties, and this too is a drawback. The sharp impact between a ball and a racquet or whatever other sports appliance is being handled, often results in a considerable shock force which is transmitted by the handle to the hand of the player. The transmission of the shock force to the hand is not substantially reduced by a friction tape sheath.

Thus "tennis elbow" is an inflammation of the elbow resulting from excessive or violent movement of the hand in the course of play. This painful condition may be aggravated by shock forces transmitted to the hand by the handle of the racquet.

In the case of baseball bats, many players wrap their bat handle with friction tape to obtain a better grip. But here again, while the resultant tape sheath enhances the gripping surface, it does little to cushion the hand against shocks produced when the bat strikes a ball traveling at high velocity.

In the case of a handle made of a highly polished metal or other hard and smooth material, as in a heavyweight exercise bar bell, it has been found that the apparent weight of the bar bell in the hand of the user is affected by the nature of the handle. Because the handle is hard to the touch and makes direct contact with the fingers of the hand, the load imposed on the hand by the handle is not dispersed or distributed thereby, and the bar bell may seem heavier than it really is. A simple analogy which explains this phenomenon is a heavy carton having a hard round wood handle. It is a common impression that this carton seems lighter when lifted if one first wraps about the wood handle a soft fabric or foam rubber cover which somewhat enlarges and softens the handle.

SUMMARY OF INVENTION

In view of the foregoing, the main object of this invention is to provide a cushioning sheath for the handle of a sports appliance which is created by winding an adhesive sports tape about the handle, the sheath also enhancing the grip.

More particularly, an object of this invention is to provide an adhesive sports tape of the above type having pneumatic cushioning characteristics whereby the sheath formed thereby acts to insulate the hand from shock forces that otherwise would be transmitted from the handle to the hand of the player.

Also an object of this invention is to provide a cushioning sheath for the handle of a sports appliance which acts to distribute the load imposed by the appliance on the hand of the player so as to make the appliance feel lighter.

Yet another object is to provide sports tape having a printable outer skin whereby the resultant sheath identifies the brand of the appliance or carries promotional data.

Briefly stated, these objects are attained in an adhesive sports tape windable about the handle of a sports appliance such as a tennis racquet to create a sheath thereabout which acts not only to enhance the grip of the handle but also as pneumatic cushioning minimizing the transmission of shock forces from the handle to the hand of the player. The tape is formed by a flexible band having an open-cell foam plastic core and opposing, gas-impermeable facing skins. The inner skin is coated with a pressure-sensitive adhesive layer to adhere the tape to the handle. The outer skin of the tape when the sheath is formed, is engaged by the hand of the player. The gas filling the cells of the core is entrapped within the tape by the skins, whereby when the tape-formed sheath is manually compressed by the player, it seeks to rebound to its original shape, thereby providing a pneumatic cushioning action. The surface of the skins is irregular, thereby enhancing the grip characteristics of the sheath.

OUTLINE OF DRAWINGS

For a better understanding of the invention as well as other objects and further features thereof, reference is made to the following detailed description to be read in conjunction with the accompanying drawings, wherein:

FIG. 1 shows a bar bell whose handle has coiled thereabout a sports tape forming a sheath in accordance with the invention;

FIG. 2 illustrates the manner in which the tape is wrapped about the handle;

FIG. 3 is a longitudinal section taken through the tape;

FIG. 4 is a perspective view of the tape with the strata thereof in a stepped formation to show their interrelationship; and FIG. 5 shows a tennis racquet having the tape wound about its handle.

DESCRIPTION OF INVENTION

Referring now to FIG. 1, there is shown a conventional metal bar bell formed by a rod-like handle 10 having detachable solid cylindrical metal weights 11 and 12 secured to either end thereof. The ends of the handle are externally threaded and are received in internally-threaded sockets formed centrally in the weight, so that one may detach and replace them with heavier or lighter weights to satisfy the exercise requirement of the user.

Handle 10 is covered by a sheath 13 formed by helically coiling an adhesive sports tape 14 about the handle in one or more convoluted layers thereon, depending on the desired thickness of the sheath. The more layers that are wound about the handle, the greater is its effective diameter. Hence, the user may enlarge the diameter of the handle to suit his needs.

As shown in FIG. 2, each layer is preferably formed by winding the tape 14 so that the convolutions are in abutting relation to produce a helix on the handle without bumps, as would occur if the convolutions in each layer were in overlapping relation.

As illustrated in FIGS. 3 and 4, tape 14 is constituted by a flexible band having a core 15 formed of open-cell foam plastic material, such as PVC or polyurethane provided with opposing facing skins 16 and 17 integral with the core, the skins being gas-impermeable. In practice, the core may have a thickness of about ⅛ of an inch, whereas the skins are much thinner.

Inner skin 17 is coated with a thin layer 18 of pressure-sensitive adhesive. This may be of the type used in standard adhesive tapes such as duct tape or Scotch tape. The exposed surface of the adhesive layer is protected by a release strip 19 which may be made of paper. Strip 19 is peeled off as the tape is applied to a handle.

The skins 16 and 17 are textured or pebbled to provide traction improving the gripping characteristics of the sheath. Outer skin 16 is printed as by silk screening, to identify a given brand, such as WILSON, or to carry promotional or other material.

In a preferred technique for making tape 14, a molten plastic mixture of the desired composition which incorporates a foaming or blowing agent is cast in film form on a sheet of carrier paper. As the molten plastic film rises due to the foaming action, it forms a core having myriad internal cells mainly in interconnected open formation. In the course of cooling and curing, the opposing faces of the core which are exposed to the atmosphere harden to create gas-impermeable skins whose surface is somewhat irregular and is pebbled or textured.

After the cast foam plastic is fully cured on the paper carrier sheet, the exposed skin is coated with a layer of pressure-sensitive adhesive, and this adhesive layer is then protectively covered by a sheet of release paper. The resultant laminate is removed from the carrier sheet and fed into a slitter where it is cut into individual tapes. These are then coiled into rolls which are suitably packaged or mounted on dispenser reels.

When tape drawn from a roll is wound about a handle to form a sheath thereabout, the adhesive side of the tape in the first layer thereof adheres to the surface of the handle and subsequent layers adhere to the underlying layers. The printed outer skin of the uppermost layer of the sheath is exposed to view and is therefore readable.

Because the gas normally filling the cells of the tape core is entrapped by the gas-impermeable skins, the air cannot escape from the tape, except to a very slight degree through the thin edges. Hence, when the sheath on the handle is compressed by the hand of the user, this compresses the entrapped air; and when manual pressure is released, the expanding gas causes the sheath to rebound, thereby providing a pneumatic cushioning action.

Instead of air or carbon dioxide or whatever other gas is involved in the foaming process, one may impregnate the cells of the core with nitrogen gas and thereby take advantage of the recoil characteristics of this gas, as in the case of pneumatic auto bumpers filled with nitrogen. And because of the cushioning action of the sheath which gives the handle a soft feel, the resultant distribution of the load by the sheath makes the load imposed on the handle seem lighter than it actually is.

A sheath in accordance with the invention may be created by means of the adhesive sports tape on any sports appliance having a handle of some sort, such as tennis racquet 20 shown in FIG. 5, whose handle 21 has a sheath 22 wrapped thereabout. And one may also apply a sheath of this type to the handles of luggage or other hand-carried articles.

While there has been shown and described a preferred embodiment of ADHESIVE SPORTS TAPE in accordance with the invention, it will be appreciated that many changes and modifications may be made therein without, however, departing from the essential spirit thereof.

I claim:

1. A sheath formed on a handle by helically winding an adhesive sports tape thereon in superposed convoluted layers to pneumatically cushion the handle, said tape comprising a flexible band having an open-cell foam plastic core and opposing facing skins integral with the core, the inner skin being coated with a layer of pressure-sensitive material, the skins being gas-impermeable and the cells in the core being filled with gas which is entrapped within the tape by the skins whereby when the sheath formed by the tape is compressed by the hand of the user, the gas is then compressed; and when the manual pressure is released, the expanding gas causes the sheath to rebound.

2. A sheath as set forth in claim 1, wherein the convolutions in each layer are in abutting relation.

3. A sheath as set forth in claim 1, wherein said skins have a textured surface to enhance the grip of the handle.

4. A sheath as set forth in claim 1, wherein said handle is that of a sports appliance which transmits a shock force to the hand, which force is reduced by the sheath.

5. A sheath as set forth in claim 1, wherein the outer skin is printed with data which is readable on the outermost layer of the sheath.

6. A sheath as set forth in claim 1, wherein said band is made of polyvinyl chloride foam plastic.

7. A sheath as set forth in claim 1, wherein said gas is nitrogen.

* * * * *